Aug. 3, 1965 D. J. SIKORRA 3,199,011
SATURABLE CORE PULSE WIDTH MOTOR CONTROL APPARATUS
Filed May 31, 1961 2 Sheets-Sheet 1

*INVENTOR.*
DANIEL J. SIKORRA
BY Roger W. Jensen
ATTORNEY

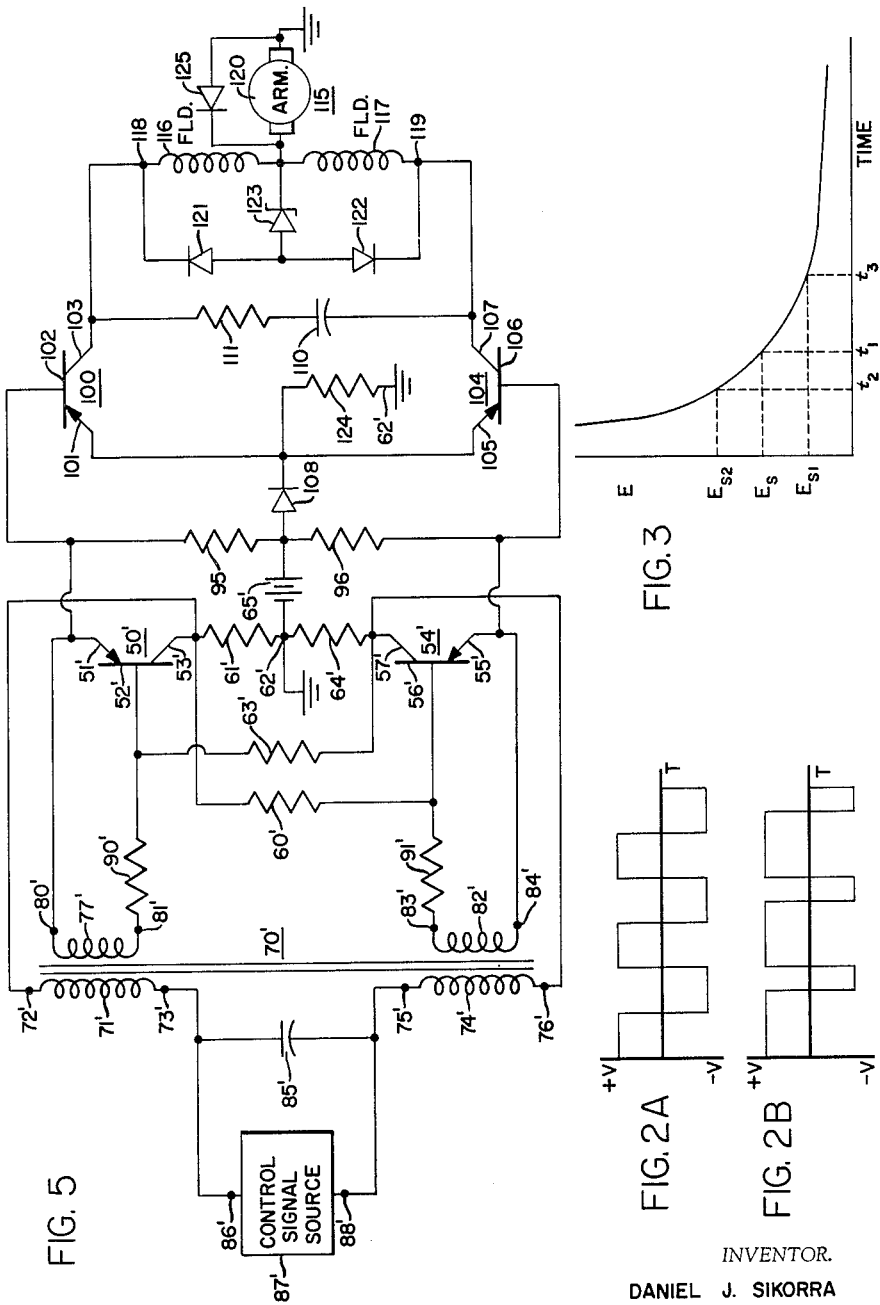

United States Patent Office 3,199,011
Patented Aug. 3, 1965

3,199,011
SATURABLE CORE PULSE WIDTH MOTOR
CONTROL APPARATUS
Daniel J. Sikorra, Champlin, Minn., assignor to
Honeywell Inc., a corporation of Delaware
Filed May 31, 1961, Ser. No. 113,885
17 Claims. (Cl. 318—341)

This invention pertains to improvements in control apparatus and more particularly to blocking oscillator or inverter circuits.

In a broad sense the invention comprises a saturable transformer connected in circuit with a pair of transistors, or other current control means, so that the primary of the transformer is energized by the conduction of the transistors and the secondary of the transformer controls and conduction and non-conduction state of the transistors. Only one of the transistors is conducting at any given time and the saturation of the transformer determines when the transistors will change from their conducting to non-conducting state or vice versa.

The inverter output, during a no signal condition, is an alternating square wave of constant magnitude, equal period, positive and negative conduction periods. A source of D.C. control signals is connected in circuit with the transformer primary to change the conduction time but not the magnitude, of the positive and negative conduction periods.

When the D.C. control signal is zero, the positive and negative conduction periods will be equal and will have equal magnitudes and hence the time average of the output wave form will be zero. When the D.C. control signal is of one polarity the conduction time of the positive conduction period will increase while the conduction time of the negative conduction period will decrease and hence the algebraic average of the output wave form will be some positive value. Similarly, when the D.C. control signal is of the opposite polarity the conduction time of the positive conduction period will decrease and the conduction time of the negative conduction period will increase with the result that the time average of the output signal will be negative.

One limitation of this circuit is that it is limited to substantially less than 100% modulation due to circuit characteristics that will be explained hereinafter.

A second species of this invention eliminates this disadvantage by cross connecting impedances between the collectors and bases of the transistors to provide a binary feedback. This increases the modulation range to substantially approach 100%.

This invention is particularly well adapted to the direct control of the series field and armature current of D.C. motors by high repetition rate switching of power transistors directly coupled to the pulse width modulated square wave oscillator.

It is one object of this invention, therefore, to provide an inverter circuit that produces a square wave output the conduction time of which is variable in response to a D.C. control signal.

Another object of this invention is to provide an inverter circuit the output of which can be substantially 100% modulated.

A further object of this invention is to provide an oscillator for use in a D.C. motor control circuit which will deliver very little power to the motor except upon motor demand.

These and other objects of my invention will become apparent to those skilled in the art upon consideration of the accompanying specification, claims and drawings of which:

FIGURE 2A illustrates the output of the circuit of FIGURE 1 in the absence of a control signal.

FIGURE 2B illustrates the output of the circuit of FIGURE 1 when a control signal is applied.

FIGURE 3 illustrates the effect of the control signal on the volt-time characteristic loop of the saturable transformer.

FIGURE 5 is a schematic diagram of an embodiment of this invention used in a motor control circuit.

Figure 1:
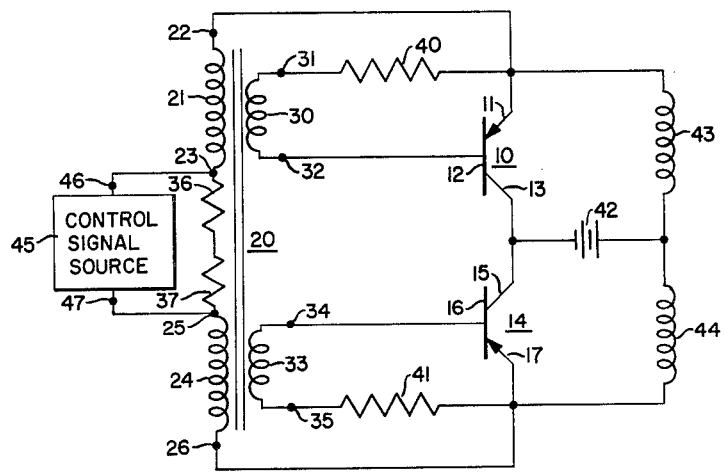
FIGURE 1 is a schematic diagram of an embodiment of this invention.

Structure of FIGURE 1

Referring to FIGURE 1, there is shown a transistor 10 having an emitter 11, a base 12 and a collector 13. Collector 13 of transistor 10 is directly connected to a collector 15 of a transistor 14. Transistor 14 further has a base 16 and an emitter 17.

A saturable transformer 20 is provided and has a first winding 21 having end terminals 22 and 23, a second winding 24 having end terminals 25 and 26, a third winding 30 having end terminals 31 and 32 and a fourth winding 33 having end terminals 34 and 35. Emitter 11 of transistor 10 is connected by means of transformer winding 21 in series with a resistor 36, a resistor 37, and transformer winding 24 to the emitter 17 of transistor 14, and by a resistor 40 in series with transformer winding 30 to the base 12 of transistor 10. Emitter 17 of transistor 14 is connected by means of a resistor 41 in series with transformer winding 33 to base 16 of transformer 14. Collector 13 of transistor 10 is connected by means of a potential source 42 in series with a load means such as a servo winding 43 to the emitter 11 of transistor 10. Collector 15 of transistor 14 is connected by means of potential source 42 in series with load means such as a servo winding 44 to emitter 17 of transistor 14. Windings 43 and 44 represent the control or activation windings for valves of a pneumatic actuator used to drive the control elements of an aircraft. The pneumatic actuator may be of the general type shown in an application, Kutzler, entitled Control Apparatus, Serial No. 843,506, filed September 30, 1959, now Patent No. 3,051,137, and assigned to the present assignee.

Terminal 23 of transformer winding 21 is connected to a terminal 46 of a control signal source 45. A terminal 47 of control signal source 45 is connected to terminal 25 of transformer winding 24.

It should be understood that it is not essential to the invention to have the primary winding of saturable transformer 20 divided into two parts 21 and 24, but that a single primary winding could be used. Furthermore, it is not essential that the control signal source 45 be inserted between the split primary windings. Source 45 could be inserted anywhere in the feedback loop.

Operation of FIGURE 1

In considering the operation of the circuit of FIGURE 1 assume initially that the output voltage of control signal source 45 is zero and that transistor 10 is just beginning to conduct. The conduction path for transistor 10 is from the battery 42 through servo winding 43, and emitter 11 to collector 13 of transistor 10 to the other side of the battery. The current flow through winding 43 causes the lower terminal of this winding to become positive with respect to the upper terminal. The volt drop across winding 43 will be coupled through winding 44 and will cause terminal 26 of transformer primary winding 24 to become positive with respect to terminal 22 of transformer primary winding 21. This volt drop across the transformer primary winding will produce a magnetizing current flow through the windings from terminal 26 through winding 24, resistor 37, resistor 36, and winding 21. The magnetizing current flow through winding 24 induces a voltage in transformer secondary winding 33 such that terminal 34 is positive with respect to terminal 35. This induced voltage in transformer secondary 33 is of such a polarity as to hold transistor 14 in its nonconducting or "off" state. The magnetizing current flow through transformer primary winding 21, however, induces a voltage in transformer secondary winding 30 such that terminal 31 is positive with respect to terminal 32. This induced voltage is of a polarity that will increase the conduction of transistor 10. The increased conduction of transistor 10 further increases the volt drop across winding 43 and hence the volt drop across the transformer primary. This positive feedback continues until saturable transformer 20 is driven to saturation.

When saturable transformer 20 saturates the voltage induced in transformer secondaries 30 and 33 disappears, and a back E.M.F. is generated due to the collapsing magnetic fields around secondary windings 30 and 33. These back E.M.F.'s are of a polarity such that transistor 10 is turned off and transistor 14 is turned on. When transistor 14 conducts current will flow from the positive terminal of battery 42 through load device 44 and emitter 17 to collector 15 of transistor 14 to the negative terminal of battery 42.

The current flow through load device 44 causes a volt drop across this winding such that the upper terminal is positive with respect to the lower terminal. The volt drop across load device 44 is coupled across the transformer primaries such that terminal 22 of winding 21 is positive with respect to terminal 26 of winding 24. This causes a magnetizing current flow through the primary windings 21 and 24 such that the voltage induced in secondary winding 30 causes terminal 32 to become positive with respect to terminal 31. This induced voltage in secondary winding 30 is of a polarity such as to hold transistor 10 in its nonconducting or "off" state. Similarly, the magnetizing current flow through primary winding 24 induces a voltage in secondary winding 33 such that terminal 35 is positive with respect to terminal 34. This induced voltage is of a polarity such that transistor 14 will increase its conduction, and hence increase the current flow through load device 44. As described hereinbefore the increase in current through load device 44 increases the volt drop across the transformer primary and hence the volt drops in the secondary windings and further increases the current flow through transistor 14.

As in the case of the conduction of transistor 10, transistor 14 will continue to conduct until saturable transformer 20 is driven to saturation in the opposite direction, at which time the voltages induced in the transformer secondaries will disappear and a back E.M.F. will be generated which will again turn transistor 14 off and transistor 10 on.

The difference output voltage wave form across loads 43 and 44 is shown in FIGURE 2A. Referring to FIGURE 2A it can be seen that the positive and negative half cycles of the square wave output have equal periods and equal but opposite magnitudes so that the time average of the output signal will be zero. Therefore, the time average of the positive and negative excitations to load devices 43 and 44 of the pneumatic actuator is zero, and the position of the aircraft control element will not change.

Assume now that a D.C. control signal appears at the output of control signal source 45 such that terminal 46 is positive with respect to terminal 47. This control signal will cause terminal 23 to become positive with respect to terminal 25.

When transistor 10 conducts, source 42 is effectively connected across primary windings 21 and 24 such that the negative terminal of source 42 is connected to terminal 22 of winding 21 and the positive terminal of source 42 is connected to terminal 26 of winding 24. Thus, source 42 acts as an energizing source for primary windings 21 and 24.

It can readily be seen that the control signal is of a polarity such that it "aids" potential source 42.

Since the volt-time product of core 20 is a constant, when the energizing voltage increases the time required to saturate the core must decrease. Since, as explained above, the control signal "aids" potential source 42 the time required to saturate the core when transistor 10 conducts decreases.

Assume that the control signal remains at the same polarity, that is, terminal 46 positive with respect to terminal 47. When transistor 14 conducts source 42 will now be effectively connected across primary windings 21 and 24 such that terminal 22 of winding 21 is positive with respect to terminal 26 of winding 24. It can now be seen that the control signal "opposes" energizing source 42 and hence the energizing voltage will be decreased. Since, as explained above, the volt-time product must remain a constant, since the energizing voltage has decreased the time now required to saturate the core must increase.

The effect of the control signal upon circuit operation can be seen by referring to FIGURE 3. FIGURE 3 shows a plot of the constant volt-time product for the transformer core. When the control signal is zero the voltage applied to primary windings 21 and 24 will be approximately equal to the source voltage 42. This voltage is represented by $E_s$ in FIGURE 3.

When $E_s$ is applied to the transformer cores 21 and 24 the conduction time of the positive and negative conduction periods will be equal to $t_1$.

However, when a control signal is applied to the transformer primaries as explained above, this control signal will add to the source in one case, when transistor 10 conducts, and will subtract from the signal source when transistor 14 conducts. This can be seen in FIGURE 3 wherein voltage $E_s2$ represents voltage applied to the transformer primaries when transistor 10 conducts and $E_s1$ represents the voltage applied to the primaries when transistor 14 conducts. From FIGURE 3 it can be seen that when $E_s2$ is applied to the transformer primaries the time required to drive the core to saturation, that is, $t_2$ has decreased, while when $E_s1$ is applied to the transformer primaries the time required to drive the core to saturation, that is $t_3$, has increased.

The output wave form when a control signal is applied to the circuit is shown in FIGURE 2B. FIGURE 2B shows that the conduction time of the positive conduction period has increased while the conduction time of the negative conduction period has decreased, the magnitude of positive and negative half cycles still being equal. If the control signal from signal source 45 is of the opposite polarity, that is terminal 47 positive with respect to terminal 46, the control signal will "aid" potential source 42 when transistor 14 conducts and will oppose source 42 when transistor 10 conducts. In this case the output waveform across load devices 43 and 44 is similar to that shown in FIGURE 2B except that the conduction time of the negative conduction period is longer than the conduction time of the positive conduction period.

As explained hereinbefore the circuit of FIGURE 1 has a limitation in that the modulation of the output is limited to substantially less than 100%. This is due to the fact that the potential source 42 and the control signal source 45 are algebraically summed across the transformer primary windings and as the magnitude of the control signal increases the primary voltage eventually reaches a point where the induced secondary voltage is not sufficient to maintain stable conduction of the transistors.

To explain further refer to FIGURE 1 and assume that the control signal from control signal source 45 is of such polarity that terminal 46 is positive with respect to terminal 47 and that transistor 14 is conducting.

With terminal 46 of control signal source 45 positive, terminal 23 of transformer primary winding 21 will be less negative. The conduction of transistor 14 through load 44 will cause the upper terminal of load 44 to be positive with respect to the lower terminal and this voltage will be coupled across the transformer primary in such a manner as to make terminal 22 positive with respect to terminal 26. It can be seen that both the volt drop across load 44 and the control signal source 45 are tending to make the terminals of winding 21 positive. As the signal from control signal source 45 increases so that terminal 23 of winding 21 becomes more and more positive the total volt drop across winding 21 decreases. If the control signal is further increased, eventually the point will be reached where the induced voltage in secondary winding 30 is decreased to the point where it can no longer effectively hold transistor 10 off. Similarly the control signal and the volt drop across winding 44 are summed in transformer primary winding 24 and as the control signal increases the volt drop across winding 24 decreases until the point is reached where the induced voltage in secondary winding 33 does not maintain a sufficient emitter to base current flow to keep transistor 14 conducting. When this point is reached unstable circuit operation occurs. Because of this circuit difficulty it has been found that the output signal modulation should be limited to substantially less than 100%.

To overcome this inherent modulation limit action a modification may be made to the circuit of FIGURE 1 if desired, and this modification will be explained in the operation of the circuit of FIGURE 4.

Figure 4:
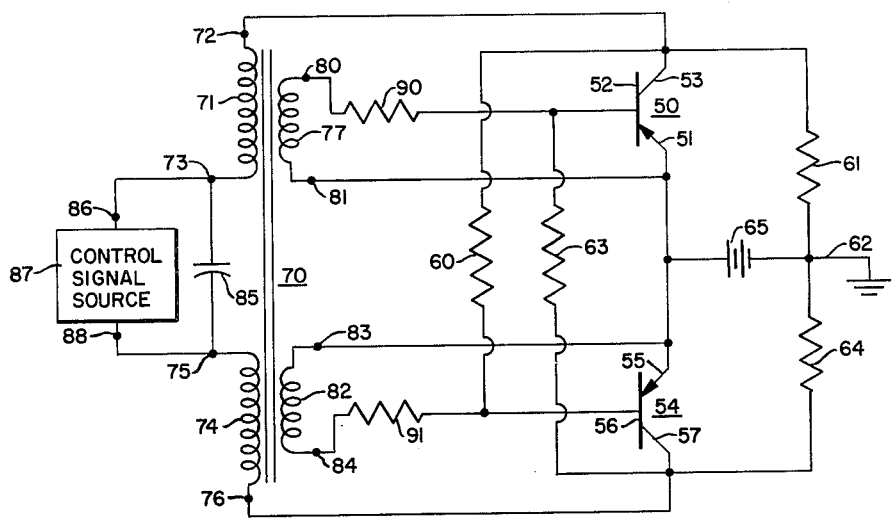
FIGURE 4 is a schematic diagram of the embodiment of this invention utilizing binary feedback to increase the output wave form modulation.

Structure of FIGURE 4

Referring to FIGURE 4 there is shown a transistor 50 having an emitter 51, a base 52 and a collector 53. Emitter 51 of transistor 50 is directly connected to an emitter 55 of a transistor 54. Transistor 54 further has a base 56 and a collector 57. Collector 53 of transistor 50 is connected by means of a resistor 60 to the base 56 of transistor 54, and by means of a resistor 61 to a common conductor, in this case ground 62. Base 52 of transistor 50 is connected by means of a resistor 63 to the collector 57 of transistor 54. Collector 57 of transistor 54 is further connected by means of a resistor 64 to ground 62. Emitters 51 and 55 of transistors 50 and 54 are connected by means of a potential source 65 to ground. A saturable transformer 70 has a first winding 71 having end terminals 72 and 73, a second winding 74 having end terminals 75, and 76, a third winding 77 having end terminals 80 and 81, and a fourth winding 82 having end terminals 83 and 84. Collector 53 of transistor 50 is serially connected by means of transformer winding 71, a capacitor 85, and transformer winding 74 to the collector 57 of transistor 54. Terminal 73 of transformer winding 71 is connected to a terminal 86 of a control signal source 87. Control signal source 87 has a further terminal 88 which is connected to terminal 75 of transformer winding 74. Base 52 of transistor 50 is connected by means of a resistor 90 in series with transformer winding 77 to the emitter 51 of transistor 50. Base 56 of transistor 54 is connected by means of a resistor 91 in series with transformer winding 82 to the emitter 55 of transistor 54.

Operation of FIGURE 4

In considering the operation of FIGURE 4, assume that the output of control signal source 87 is zero and that transistor 50 is just beginning to conduct.

When transistor 50 conducts current will flow from potential source 65 through the emitter 51 to collector 53 of transistor 50 and resistor 61 to the other side of the battery. This current flow through resistor 61 causes the upper terminal of resistor 61 to become positive with respect to the lower terminal. This volt drop across resistor 61 will be coupled through resistor 64 to the primary of transformer 70 such that terminal 72 will become positive with respect to terminal 76.

The volt drop across the primary windings 71 and 74 cause a magnetizing current to flow through these primaries which in turn induces a voltage into the secondary windings 77 and 82, the voltage in winding 77 being of such polarity that terminal 81 is positive with respect to terminal 80 and the voltage in winding 82 being of such polarity that terminal 84 is positive with respect to terminal 83.

The voltage induced in secondary 77 causes a current flow from terminal 81 through the emitter 51 to base 52 of transistor 50 and resistor 90 to terminal 80 of secondary 77. This current flow further increases the conduction of transistor 50 through resistor 61. The voltage induced in transformer secondary winding 82 is of such polarity that the base 56 of transistor 54 is positive with respect to the emitter 55 and hence transistor 54 is in its "off" or non-conducting position.

It should be noted that while one path for the base current flow of transistor 50 is through resistor 90 and winding 77 a second path is from the battery 65 through emitter 51 to base 52, resistor 63 and resistor 64 to the other side of the battery 65. The effect of this additional base current path will be explained more fully hereinafter.

The conduction of transistor 50 continues until the voltage produced across the transformer primary windings drives the transformer core to saturation. When the transformer core saturates the voltage induced in the transformer secondary windings 77 and 82 will disappear and a back E.M.F. will be generated by the collapsing fields around the secondary windings such that transistor 50 will be turned to its non-conducting or "off" state and transistor 54 will be turned to its conducting or "on" state. When transistor 54 begins to conduct current will flow from the battery 65 through emitter 55 to collector 57 of transistor 54 and resistor 64 to the other side of battery 65. This current flow will produce a volt drop across resistor 64 such that the lower terminal will be positive with respect to the upper terminal. This voltage across resistor 64 will be coupled through resistor 61 to the primary windings of transformer 70 such that terminal 76 will be positive with respect to terminal 72.

The magnetizing current flow produced through transformer winding 74 and 71 due to the volt drop across resistor 64 induces a voltage into transformer secondary winding 82 such that terminal 84 will be negative with respect to terminal 83, and terminal 80 will be positive with respect to terminal 81. The voltage induced in transformer secondary winding 82 causes a current flow from terminal 83 through the emitter 55 to base 56 of transistor 54 and resistor 91 to terminal 84, increasing the conduction of transistor 54.

The voltage induced in transformer secondary winding 77 is of a polarity such that the base 52 of transistor 50 will be positive with respect to its emitter 51 and hence transistor 50 will be cut off.

As explained hereinbefore with respect to transistor 50 there is an additional current flow path for the base current of transistor 54. This path is from the battery 65 through the emitter 55 to the base 56 of transistor 54, resistor 60 and resistor 61 to the other side of battery 65.

The current flow through transistor 54 will continue until transformer 70 is driven into saturation, at which time the secondary induced voltages will disappear and a back E.M.F. will be generated which will reverse the conductions of transistors 54 and 50 and will turn transistor 50 on and transistor 54 off.

The output voltage from the inverter circuit in this mode of operation is similar to that shown in FIGURE 2A.

The operation of the circuit of FIGURE 4 in response to a D.C. control signal is substantially the same as explained in the operation of FIGURE 1 and will not be repeated. However, while the circuit of FIGURE 1 is limited, as hereinbefore explained, to substantially less than 100% modulation, the same is not the case for the circuit of FIGURE 4. The output of the circuit shown in FIGURE 4 can be modulated to substantially 100%. The reason for the substantial increase in the amount of modulation possible with the circuit of FIGURE 4 is due to the binary feedback arrangement comprising resistors 60 and 63.

As explained previously when a D.C. control signal is applied to bias the transformer core, the control signal and the source voltage dropped across resistors 61 or 64 algebraically sum with the control signal across the primary windings of transformer 70. When the control signal becomes large enough the voltage induced in secondary windings 77 and 82 are no longer sufficient in and of themselves to maintain a sufficient current flow in the base circuit of the conducting transistor, and hence this transistor tends to stop conducting. In the circuit of FIGURE 4, however, the base current flow is not solely dependent upon the voltage induced in the secondary windings, but rather has an auxiliary current flow path through resistors 60 and 63 as explained before. This auxiliary current flow path for the base current allows the control signal to be raised to a much higher level, approximately equal to potential source 65, without affecting the stability of the circuit and hence the modulation of the output wave form can be varied to substantially 100%.

Structure of FIGURE 5

The circuit shown schematically in FIGURE 5 utilizes substantially the same inverter circuit shown in FIGURE 4. The only difference between the inverter of FIGURE 5 and that of FIGURE 4 is that a resistor 95 in series with a resistor 96 have been connected from the emitter 51' of transistor 50' to emitter 55' of transistor 54'. Since the oscillator of FIGURE 5 is the same as that of FIGURE 4 the operation of the circuit will not be repeated and the descriptive numerals are the same except that a prime (') has been added.

A transistor 100 has an emitter 101, a base 102 and a collector 103. Emitter 101 of transistor 100 is connected by means of a reversed diode 108 to the positive terminal of battery 65'. The base 102 of transistor 100 is connected directly to the emitter 51' of transistor 50'. A transistor 104 has an emitter 105 and base 106 and the collector 107. The emitter 105 of transistor 104 is directly connected to the emitter 101 of transistor 100. The base 106 of transistor 104 is connected directly to emitter 55' of transistor 54'. Collector 107 of transistor 104 is connected by means of a capacitor 110 in series with resistor 111 to the collector 103 of transistor 100. A D.C. motor 115 has split field windings 116 and 117, field winding 116 having an end terminal 118 and field winding 117 having an end terminal 119. The motor armature winding 120 is connected intermediate the split field windings 116 and 117 to ground. Collector 103 of transistor 100 is directly connected to terminal 118 of field winding 116. Collector 107 of transistor 104 is directly connected to terminal 119 of field winding 117. Terminal 118 is connected by means of a reversed diode 121 in series with a diode 122 to terminal 119 of winding 117. The junction between diodes 121 and 122 is connected by means of a Zener diode 123 to the junction between field windings 116 and 117. Emitters 101 and 105 of transistors 100 and 104 are connected to ground 62' by means of a resistor 124.

Operation of FIGURE 5

The operation of the inverter portion of the motor control circuit of FIGURE 5 has been explained previously in conjunction with FIGURE 4 and will not be repeated.

Transistors 100 and 104 are normally biased to their non-conducting or "off" state due to current flow from battery 65' through diode 108, resistor 124 and ground back to the other side of battery 65'. The current flow through silicon diode 108 produces a volt drop across this diode which is coupled through resistors 95 and 96 to the bases 102 and 106 of transistors 100 and 104 and makes the bases of these transistors positive with respect to their emitters.

Assume now that the D.C. control signal from signal source 87' is zero so that the conduction times of transistors 50' and 54' are equal. Assume further that transistor 50' is conducting. This conduction of transistor 50' lowers the base potential on the base 102 of transistor 100 so that the base is now negative with respect to the emitter 101 and base current will flow in transistor 100. This base current flow is from battery 65' through diode 108, emitter 100 to base 102 of transistor 100, emitter 51' to collector 53' of transistor 50' and resistor 61' to the other side of the battery. The base current flow in transistor 100 turns this transistor to its conducting or "on" state. When transistor 100 is "on" current flows from the battery 65 through diode 108, emitter 101 to collector 103 of transistor 100, field winding 116 and armature 120 to the other side of battery 65'.

As explained hereinbefore the conduction of transistor 50' will eventually drive the core of transformer 70' into saturation whereupon transistor 50' will cut off and transistor 54' will conduct. This current flow through transistor 54' lowers the potential on the base 106 of transistor 104 so that base current now flows in transistor 104. This current flow path is from battery 65' through diode 108, emitter 105 to base 106 of transistor 104, emitter 55' to collector 57' of transistor 54', and resistor 64' to the other side of battery 65'. The base current flow in transistor 104 turns this transistor to its conducting or "on" state and a further current will flow from the battery 65', through diode 108, emitter 105 to collector 107 of transistor 104, field winding 117 and armature winding 120 to the other side of battery 65'. The conduction of transistors 100 and 104 deliver an alternating excitation signal of equal magnitude and period to the field windings 116 and 117 of motor 115. Due to the fact that windings 116 and 117 tend to rotate motor 115 in opposite directions and that windings 116 and 117 also offer a fairly high reactance to alternating signals the current flow in the armature 120 of motor 115 is very small and motor 115 does not operate.

Assume now that a control signal is applied to the circuit from control signal source 87' such that transistor 50' is biased to have a longer conducting period than transistor 54'. Since the conduction period of transistor 100' is determined by the conduction period of transistor 50', transistor 100 will also have a longer conducting period than transistor 104. Therefore, the excitation signal applied to field windings 116 and 117 of motor 115 will no longer have equal periods and hence a resulting D.C. current will flow through field winding 116 and armature 120 causing motor 115 to operate.

Similarly, if the control signal from control signal source 87' had been of the opposite polarity then transistor 54' and hence transistor 104 would have had a longer conducting period than transistors 50' and 100 and therefore the resulting D.C. energization would have flowed through field winding 117 and armature 120 and caused motor 115 to revolve in the opposite direction.

Diodes 121, 122 and Zener diode 123 connected across the field windings 116 and 117 of motor 115 form a protection device which prevents the burning out of transistors 100 and 104 by the high surge currents generated by the collapsing magnetic fields around windings 116 and 117. Assume that field winding 116 is energized due to the conduction of transistor 100. When transistor 100 cuts off the magnetic field set up around winding 116 collapses and tends to keep the current flow in the same direction. Zener diode 123 and diode 121 prevent this collapsing magnetic field from generating high voltages and damaging the transistors. When the field collapses around winding 116 the current flow flows through Zener diode 123 and diode 121 to terminal 118 of winding 116 and thereby the energy in the field is dissipated without any harmful effects. Zener diode 123 and diode 122 form a similar type of protection device around field winding 117.

Similarly, diode 125 in parallel with armature winding 120 provides a protection device for the transistors when the armature field collapses due to a sudden reversal of the motor rotation. Diode 125 provides a further advantage in that when the field around armature 120 collapses diode 125 effectively shorts out the armature and produces a circulating armature current which produces a large dynamic braking of the motor. This dynamic braking greatly improves the motor response.

It is to be understood that while I have shown specific embodiments of my invention this is for the purpose of illustration only, and that my invention is to be limited solely by the scope of the appended claims.

I claim as my invention:

1. Apparatus of the class described comprising: first and second transistors each having a collector electrode, a base electrode, and an emitter electrode; a saturable transformer having first, second, third and fourth windings; resistance means; means connecting said first winding, said resistance means and said second winding in series relationship across said emitter electrodes; first and second servos each having a control winding; means connecting the control windings of said first and second servos in series across said emitter electrodes; a source of energizing potential; means connecting said potential source from a junction intermediate said control windings to the collector electrodes of said first and second transistors; means connecting said third and fourth windings from the emitter to base electrodes of said first and second transistors respectively; and means adapted to connect a source of control signals across said resistance means.

2. Apparatus of the class described comprising: first and second current control means; first and second servos each having a control winding; first and second current paths, each of said paths including one of said current control means and one of said servo windings; a magnetic core having first, second, third and fourth windings; means connecting said first and second windings in series across said servos; means connecting said third and fourth windings to said first and second current control means respectively so that the feedback voltage induced in said third and fourth windings operates said current control means to establish periodically a current conducting condition in said first path and a non-conducting condition in said second path followed by a non-conducting condition in said first path and a conducting condition in said second path; and means adapted to connect a source of control signals in circuit with said first and second windings to vary the conducting and non-conducting time of said first and second current paths.

3. Apparatus of the class described comprising: first and second current control means; first and second impedance means; first and second current paths, each of said paths including one of said current control means and one of said impedances; a magnetic core having first, second, third and fourth windings wound in inductive relation thereto; means connecting said first and second windings in series across said impedance means; means connecting said third and fourth windings to said first and second current control means respectively so that the feedback voltage induced in said third and fourth windings operates said current control means to establish periodically a current conducting condition in said first path and a non-conducting condition in said second path followed by a non-conducting condition in said first path and a conducting condition in said second path; means directly connecting a source of control signals to said first and second windings to vary the conducting and non-conducting time of said first and second current paths; a split field D.C. motor; third and fourth current control means each having an input electrode, an output electrode and a control electrode; means connecting the split field of said motor across the output electrodes of said third and fourth current control means; a source of energizing potential; means connecting said potential source to the input electrodes of said third and fourth current control means; and means connecting the control electrodes of said third and fourth current control means to said first and second current control means respectively.

4. Apparatus of the class described comprising: first and second current control means; first and second impedances; first and second current paths, each of said paths including one of said current control means and one of said impedances; a magnetic core having first, second, third and fourth windings wound in inductive relation thereto; means connecting said first and second windings in series across said first and second impedances; means connecting said third and fourth windings to said first and second current control means to produce a first feedback whereby said first and second current control means are operated to establish periodically a current conducting condition in said first path and a non-conducting condition in said second path followed by a non-conducting condition in said first path and a conducting condition in said second path; means adapted to connect a source of control signals in circuit with said first and second windings to vary the conducting and non-conducting time of said first and second current paths; and third and fourth impedance means cross-connected between said first and second current control means to provide a second feedback to said control means.

5. Motor control means comprising: first, second, third and fourth transistors each having a collector electrode, a base electrode and an emitter electrode; a source of energizing potential; first, second, third and fourth impedance means; a first current path including said first transistor, said first and second impedances and said potential source; a second current path including said second transistor, said third and fourth impedance means and said potential source; a magnetic core having first, second, third and fourth windings wound in inductive relation thereto; means connecting said first and second windings in series across said collector electrodes of said first and second transistors; means connecting said third and fourth windings from the emitter to base electrodes of said first and second transistors respectively; means adapted to connect a source of input signals in circuit with said first and second windings; fifth and sixth impedance means respectively cross-connected between the collector and base electrodes of said first and second transistors; a split field D.C. motor; means connecting the field windings of said motor across the collector electrodes of said third and fourth transistors; means connecting the emitter electrodes of said third and fourth transistors to said potential source; and means connecting the base and emitter electrodes of said third and fourth transistors respectively across said second and fourth impedances.

6. Apparatus of the class described comprising: first and second current control means; first and second resistors; a source of energizing potential; first and second current paths, each of said paths including one of said current control means, one of said resistors, and said potential source; a magnetic core having first, second, third and fourth windings wound in inductive relation thereto; means connecting said first and second windings in series from said first current control means to said second current control means; means connecting said third and fourth windings to said first and second current control means respectively whereby the signal induced in said third and fourth windings operate said current control means to establish periodically a current conducting condition in said first path and a non-conducting condition in said second path followed by a non-conducting condition in said first path and a conducting condition in said second path; means adapted to connect a source of control signals in circuit with said first and second windings to vary the conducting period of said first and second current control means; and first and second impedances cross connected between said first and second current control means to provide feedback signals to said first and second current control means whereby the conduction period of said control means is dependent upon said source of control signals and is substantially independent of the signal induced in said third and fourth windings.

7. Apparatus of the class described comprising: first and second semiconductor means each having an output electrode, a control electrode and a common electrode; a magnetic core having first, second, third and fourth windings; means connecting said first and second windings in series from the output electrode of said first semiconductor means to the output electrode of said second semiconductor means; means connecting said third and fourth windings from the control electrode to the common electrode of said first and second semiconductor means respectively; first and second impedance means cross connected between the output and control electrodes of said first and second semiconductor means respectively; a source of energizing potential connected from the common electrodes of said first and second semiconductor means to a common conductor; and first and second load means connected from the output electrodes of said first and second semiconductor means respectively to a common conductor.

8. Apparatus of the class described comprising: first and second transistors each having a collector electrode, a base electrode, and an emitter electrode; a saturable transformer having first, second, third and fourth windings; impedance means; means connecting said first winding, said impedance means and said second winding in series relationship across said emitter electrodes; first and second load means; means connecting said first and second load means in series across said emitter electrodes; a source of energizing potential; means connecting said potential source from a junction intermediate said load means to the collector electrodes of said first and second transistors; means connecting said third and fourth windings from the emitter to base electrodes of said first and second transistors respectively; and means adapted to connect a source of control signals across said impedance means.

9. Apparatus of the class described comprising: first and second current control means; first and second impedance means; first and second current paths, each of said paths including one of said current control means and one of said impedance means; a magnetic core having first, second, third and fourth windings; means connecting said first and second windings in series across said first and second impedance means; means connecting said third and fourth windings to said first and second current control means respectively so that the feedback voltage induced in said third and fourth windings operates said current control means to establish periodically a current conducting condition in said first path and a non-conducting condition in said second path followed by a non-conducting condition in said first path and a conducting condition in said second path; and further means directly connecting a source of control signals to said first and second windings to vary the conducting and non-conducting time of said first and second current paths.

10. Apparatus of the class described comprising: first and second current control means; first and second impedances; first and second current paths, each of said paths including one of said current control means and one of said impedances; a magnetic core having first, second, third and fourth windings wound in inductive relation thereto; means connecting said first and second windings in series across said first and second impedances; means connecting said third and fourth windings to said first and second current control means to produce a first feedback whereby said first and second current control means are operated to establish periodically a current conducting condition in said first path and a non-conducting condition in said second path followed by a non-conducting condition in said first path and a conducting condition in said second path; and third and fourth impedance means cross connected between said first and second current control means to provide a second feedback to said control means.

11. Apparatus of the class described comprising: first and second semiconductor means each having an output electrode, a control electrode and a common electrode; a magnetic core having first, second, third and fourth windings; means connecting said first and second windings in series from the output electrode of said first semiconductor means to the output electrode of said second semiconductor; means connecting said third and fourth windings from the control electrode to the common electrode of said first and second semiconductor means respectively; first and second impedance means cross connected between the output and control electrodes of said first and second semiconductor means respectively; a source of energizing potential connected from the common electrodes of said first and second semiconductor means to a common conductor first and second load means connected from the output electrodes of said first and second semiconductor means respectively to a common conductor; and means adapted to connect a source of control signals in circuit with said first and second windings.

12. Apparatus of the class described comprising: first, second, third and fourth semiconductor means each having an output electrode, a control electrode, and a common electrode; a magnetic core having first, second, third and fourth windings; means connecting said first and second windings in series from the output electrodes of said first semiconductor means to the output electrode of said second semiconductor means; means connecting said third and fourth windings from the control electrode to the common electrode of said first and second semiconductor means respectively; first and second impedance means cross connected between the output and control electrodes of said first and second semiconductor means respectively; third and fourth impedance means connected from the output electrodes of said first and second semiconductor means respectively to a common conductor; fifth and sixth impedance means serially connected between the common electrodes of said first and second semiconductor means; a source of energizing potential connected from the junction between said fifth and sixth impedances to the common conductor; a split field motor connected across the output electrodes of said third and fourth semiconductor means; means connecting the control and common electrode of said third and fourth semiconductor means across said fifth and sixth impedances respectively; and means adapted to connect a source of control signals in circuit with said first and second windings.

13. Apparatus of the class described comprising: first and second current control means; first and second impedances; first and second current paths, each of said paths including one of said current control means and one of said impedances; a magnetic core having first, second, and third windings wound in inductive relation thereto; means connecting said first winding across said first and second impedances; means connecting said second and third windings to said first and second current control means to produce a first feedback whereby said first and second current control means are operated to establish periodically a current conducting condition in said first path and a non-conducting condition in said second path followed by a non-conducting condition in said first path and a conducting conditions in said second path; means adapted to connect a source of control signals in circuit with said first winding to vary the conducting and non-conducting time of said first and second current paths; and third and fourth impedance means cross connected between said first and second current control means to provide a second feedback to said control means.

14. Apparatus of the class described comprising: first and second semiconductor means each having an output electrode, a control electrode and a common electrode; a magnetic core having first, second and third windings; means connecting said first winding from the output electrode of said first semiconductor means to the output electrode of said second semiconductor means; means connecting said second and third windings from the control electrode to the common electrode of said first and second semiconductor means respectively; first and second impedance means cross connected between the output and control electrodes of said first and second semiconductor means respectively; a source of energizing potential; means connecting said potential source from the common electrodes of said first and second semiconductor means to a common conductor; and third and fourth impedance means connected from the output electrodes of said first and second semiconductor means respectively to a common conductor.

15. Apparatus of the class described comprising: first and second current control means; first and second impedances; a source of energizing potential; first and second current paths, each of said paths including one of said current control means, one of said impedances, and said potential source; a magnetic core having first, second and third windings wound in inductive relation thereto; means connecting said first winding from said first current control means to said second current control means; means connecting said second and third windings to said first and second current control means respectively whereby the signal induced in said second and third windings operate said current control means to establish periodically a current conducting condition in said first path and a non-conducting condition in said second path followed by a non-conducting condition in said first path and a conducting condition in said second path; means adapted to connect a source of control signals in circuit with said first winding to vary the conducting period of said first and second current control means; and third and fourth impedances cross connected between said first and second current control means to provide feedback signals to said first and second current control means whereby the conduction period of said control means is dependent upon said source of control signals and is substantially independent of the signal induced in said second and third windings.

16. Apparatus of the class described comprising: first and second current control means; first and second impedance means; first and second current paths, each of said paths including one of said current control means and one of said impedance means; a magnetic core having first, second and third windings; means connecting said first winding across said first and second impedance means; means connecting said second and third windings to said first and second current control means respectively so that the feedback voltage induced in said second and third windings operates said current control means to establish periodically a current conducting condition in said first path and a non-conducting condition in said second path followed by a non-conducting condition in said first path and a conducting condition in said second path; and further means directly connecting a source of control signals to said first winding to vary the conducting and non-conducting time of said first and second current paths.

17. Apparatus of the class described comprising: first and second current control means; a source of energizing potential; load means; a current path including said load means, said source of energizing potential, and one of said current control means; a magnetic core having first, second, and third windings; means connecting said first and second windings to said first and second current control means respectively so that feedback voltage induced in said first and second windings operates said current control means to establish periodically a current conducting condition in said current path followed by a non-conducting condition in said current path; means directly connecting a source of control signals to said third winding to vary the conducting and non-conducting time of said current path; and means for connecting said third winding across said load means.

References Cited by the Examiner

UNITED STATES PATENTS

| | | | |
|---|---|---|---|
| 2,698,392 | 12/54 | Herman. | |
| 2,814,769 | 11/57 | Williams | 318—171 |
| 2,849,614 | 8/58 | Royer et al. | 331—113.1 X |
| 2,873,371 | 2/59 | Van Allen | 331—113.1 X |
| 2,886,763 | 5/59 | Zelina | 322—25 |
| 2,886,764 | 5/59 | Zelina | 322—25 |
| 2,994,840 | 8/61 | Dorsman | 331—113.1 |
| 3,003,096 | 10/61 | Du Bois | 318—448 X |
| 3,079,539 | 2/63 | Guerth | 318—341 X |
| 3,083,327 | 3/63 | Byloff | 318—341 X |
| 3,090,897 | 5/63 | Hammann | 318—341 X |

FOREIGN PATENTS 827,729   2/60   Great Britain.

OTHER REFERENCES

German application, 1,018,913, November 7, 1957.

ORIS L. RADER, *Primary Examiner.*

JOHN F. COUCH, *Examiner.*